N. Sanderson,
Cutlery.

No. 93,560.          Patented Aug. 10, 1869.

Inventor          Witnesses

United States Patent Office.

WILLIAM SANDERSON, OF NEW YORK, N. Y.

Letters Patent No. 93,560, dated August 10, 1869.

---

IMPROVEMENT IN CUTLERY.

---

The Schedule referred to in these Letters Patent and making part of the same.

---

*To all whom it may concern:*

Be it known that I, WILLIAM SANDERSON, of New York city, of New York county, in the State of New York, have invented certain new and useful "Improvements in Manufacture of Handles for Knives, Forks, &c.;" and I do hereby declare that the following is a full and exact description thereof, reference being had to the accompanying drawings, making part of this application.

My invention relates to certain new and useful improvements in the manufacture of cutlery, and is adapted particularly to knife and fork-handles.

Previous to my present invention, various ways of forming the handles of knives, forks, &c., and uniting the material of the handle to the tang of the instrument, have been devised and practised; and several Letters Patent have been already granted to me on this subject.

In the Letters Patent granted to me, June 9, 1868, the invention set forth and claimed, is forming the handle and uniting it to the tang, simultaneously, by compression.

I have discovered that a very desirable, economic, more durable and stronger article may be produced, by forming the handle of a suitable composition, enveloped or covered by a suitable casing of sheet-metal, or other suitable material, and have devised a variety of ways in which such envelope or casing may be applied and secured, in connection with the composition compressed around the tang.

My present invention consists in making handles for knives and other instruments, of a suitable composition compressed around the tang, and confined within or enveloped by a suitable case or covering of thin sheet-metal, or other material, as hereinafter more fully set forth.

To enable those skilled to make and use my invention, I will proceed to more fully explain it, referring by letters to the accompanying drawings, in which—

In the several figures, A is the blade; B, the bolster; and C, the handle of a dining or case-knife, about similar in shape and design to those now made and used.

As my present invention relates wholly to the method of making and peculiarities of the handle, I need only describe particularly this part of the instrument.

Figure 1:
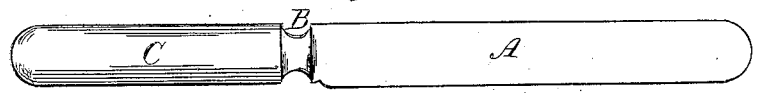
Figure 1 is an elevation of a knife, made according to my invention.
Figure 2:
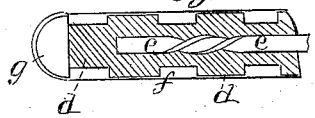
Figure 2 is a partial section of the handle of same.
Figures 4, 5:
Figure 4 is a detail view of the end of the block of handle, seen at fig. 2.
Figure 5 is a cross-section of handle.

The knife represented at fig. 1 has its handle C formed, as shown at fig. 2, of composition $d$, moulded around the tang $e$, under heavy pressure between dies, (after the fashion set forth in my former patent, hereinbefore referred to,) and a sheet-metal casing or envelope, $f$, which may be formed with flanged lips, as seen, and which I propose to form around the composition by and between the compressing-dies, so that when the handle leaves the dies, it will be completed, or compressed into the shape shown, and so that the flanged lips will be confined within and by the composition $d$, as clearly shown at fig. 5.

Figure 6:
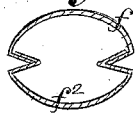
Figures 6 and 7 are detail sectional views, showing another mode of forming the metallic envelope or case.
Figure 7:

In lieu of making the lips simply as seen at this figure, they may be made with a double bend on one half of the case $f^2$, (see figs. 6 and 7,) so that when compressed together and around the composition, they will interlock with each other, as clearly shown. By this means, the metallic envelope is rendered stronger, and the whole handle more rigid and durable.

Figure 8:
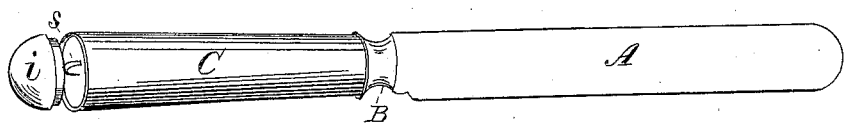
Figure 8 is an elevation of a knife having the casing or envelope formed of a seamless tube, provided with a button or separate end-piece.

At fig. 8, I have illustrated the handle as formed of a seamless tube, extending from the bolster B up to the convex-end portion, which latter I propose to form of a hollow thimble or block, $i$, in such manner, with a projecting tang or lug, $s$, that it will fit into the open end of the tube, and be held in by the interlocking of its tang or lug $s$ in the composition.

In making the handle after this modification, it will be necessary to confine the tube C (in a vertical position) in a suitable die, fill in the composition, and then place in the plug $i$, which must be forced down by a follower or plunger until the composition contained both in the dies and tube C, shall have been all forced and compressed into the latter, and the block or plug $i$ firmly seated in the end of said tube C, with its lug or tang $s$ secured in the compressed composition.

Figures 9, 10:
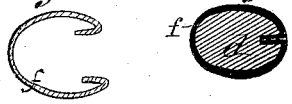
Figures 9 and 10 are detail sectional views, showing still another way of forming the metallic casing.

At figs. 9 and 10, I have shown still another modification in which the metallic casing or composition-envelope is made of a single piece, bent round and united, so that only one seam or joint is formed.

In any instance deemed advisable, the joint should be soldered before plating and finishing up the handle.

In lieu of the solid end-block $g$, which I have used at the end, (where it is difficult to form any flanges, on account of the liability of the sheet-metal to buckle,)

Figure 3:
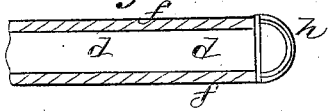
Figure 3 is a similar partial section, showing modification.

I propose, if found expedient, to use a thimble of sheet-metal, $h$, as shown at fig. 3.

Figure 11:
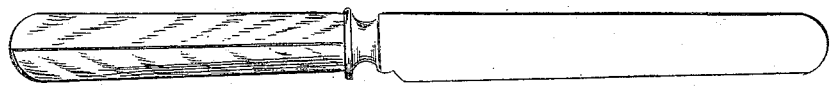
Figure 11 is an elevation of a knife having the composition-compressed handle covered or enveloped with a thin sheet of horn, wood, bone, ivory, or other fibrous covering, (in lieu of metal, as seen in the other figures.)

At fig. 11, I have shown a knife in which the composition of the handle has an envelope of very thin wood, horn, bone, ivory, or other fibrous material applied to and united around it in the dies during the act of compression.

This covering of thin wood, or other fibrous material, may have its exterior varnished, enamelled, or otherwise polished, and will not only add much to the strength and toughness of the handle, but will give it any design in wood colors, or the appearance of ivory, or other material, desired.

It will be understood that by making a handle of a knife or other instrument, of a suitable composition, moulded or formed around the tang, under pressure, and with an envelope or casing of any suitable material, simultaneously secured over the composition, as hereinbefore described, or in any other manner substantially the same as set forth, a manufacture is produced which is exceedingly strong and durable, while, at the same time, it is economic, and may be designed to any configuration and color desired.

A great desideratum gained by my invention is the production of a handle, possessing all these desirable characteristic features, which, at the same time, has its composition portion wholly enveloped, and the envolope firmly secured in or to the composition.

It will be understood that the different elements composing the handle, may be each prepared previously, and that when brought together in the forming-dies, the completed article results from the single operation of compression.

A handle, such as shown and described, produced according to my invention, will not be injuriously affected by subjection to hot water, or any heat to which cutlery is liable to be subjected.

Of course the design and material may be varied to suit the wishes of the manufacturer, and according to the costliness of the article to be produced, and my invention, it will be understood, may be applied in the manufacture of any and all kinds of instruments or implements having handles.

Without wishing to be understood as either limiting my claim of invention to any one of the detail features of construction, or as claiming anything already covered by my former patent, What I do claim broadly, and desire to secure by Letters Patent, is—

The manufacture or formation of handles of a suitable core of composition, enveloped by a casing or covering, and the two united or connected and formed around the tang by compression, substantially as set forth.

In testimony whereof, I have hereunto set my hand and seal, this 24th day of June, in the year 1869.

WM. SANDERSON. [L. S.]

Witnesses:
 THOMAS B. CLOTWORTHY,
 CHAS. A. SCOTT.